3,349,078
PROCESS OF PREPARING SULFATE ESTERS OF ALGIN AND PRODUCTS OBTAINED THEREBY
Richard G. Schweiger, San Diego, Calif., assignor to Kelco Company, San Diego, Calif., a corporation of Delaware
No Drawing. Filed Feb. 26, 1964, Ser. No. 347,361
18 Claims. (Cl. 260—209.6)

This invention relates to a novel process for the preparation of sulfate esters of algin, and to the products obtained thereby.

It is a known to prepare sulfate esters of algin, viz., of alginic acid; most generally the methods used involved the joint use of chlorosulfonic acid and pyridine. The products obtained are highly degraded, that is, the molecular weight is much less than that of the starting algin. For certain uses this is indeed not a disadvantage, and in fact a highly degraded sulfate ester of algin is of interest pharmacologically as an anticoagulant.

A field of usefulness for sulfate esters of algin has been untouched by previous workers in this general field because of the very fact of degradation, as mentioned. Thus, the degraded products previously known have an extremely low viscosity in aqueous solution, and thus are unsuitable for thickening and protective colloid applications.

An object of the present invention is to provide a process for making sulfate esters of algin without the concomitant degradation of prior art methods.

Another object of the invention is to provide a method for the production of algin sulfates with varying degrees of substitution and substantially free of degradation.

Other objects of the invention will appear as the description thereof proceeds.

Generally speaking and in accordance with illustrative embodiments of my invention, I bring together alginic acid in an activated, anhydrous form with a complex consisting of sulphur trioxide and an N-dialkyl amide chosen from the group consisting of dimethyl formamide, dimethyl acetamide, dimethyl propionamide, diethyl formamide, and diethyl acetamide. An amount of sulphur trioxide is used which is at least sufficient to achieve the degree of substitution (D.S.) desired in the product; this may range from about 0.1 to about 1.9; a D.S. of about 2.0 is the maximum theoretically possible because each unit comprising the alginic acid polymer has two hydroxy groups. Useful products are obtained at a D.S. of as low as 0.1 but lower than this, the products differe relatively little from the starting material and are not especially useful. At the other end of the range, a D.S. of 1.7 gives products quite as useful as those having the slightly higher D.S.'s of 1.8 or 1.9, and as the latter involve especially careful experimental procedures, here again it is scarcely worthwhile to try to exceed a D.S. of 1.7 or 1.8 as a practical matter.

The amount of dialkyl amide used, or indeed a mixture of these, is at least sufficient to form an equimolar complex with the sulphur trioxide. An additional dialkyl amide over and above this amount acts merely as a diluent, and depending upon the mechanical procedures chosen, may be advantageous or not.

The activated anhydrous alginic acid used in accordance with my invention is obtained most conveniently by dehydrating the wet swollen fiber obtained in the usual commercial preparation of algin from the various seaweed species, with glacial acetic acid, although I may use anhydrous propionic acid. As a practical working rule, I use from two to six times as much of the dialkyl amide-sulphur trioxide complex based on the weight of the dry alginic acid. I prefer dimethyl formamide and find this best, although the others listed hereinabove, or mixtures thereof, with or without dimethyl formamide are also useful. The presence of acetic or propionic acid does not influence the sulfation disadvantageously nor does it introduce any acetyl or propionyl groups. In fact, even the DMF-SO$_3$ complex may be prepared in the presence of these acids, and the resulting mixture may be used successfully for sulfating alginic acid. I prefer and find best a temperature in the range 0° C. to 10° C. At higher temperatures, degradation may become a problem. The reaction times found necessary for achieving the selected D.S. range from about one to three hours, and most generally from about one and one-half to two hours. However, longer reaction times at lower temperatures do not cause any degradation.

After preparation of my algin sulfate esters I may leave them in the acid form or I may neutralize them with selected bases, such as alkali metals and ammonium, or substituted ammonium cations.

Some examples of my invention will now be given in which "DMF" stands for dimethyl formamide, and in which "D.S." stands for degree of substitution.

*Example I*

Alginic acid (800 g.; 22.1% solids; high viscosity) was washed five times with 800 cc. portions of glacial acetic acid and filtered off on a Büchner funnel each time. This material (971 g.) was split into four equal portions. Each portion was mixed separately with 150 cc. of DMF in a Hobart mixer while being cooled with ice water. Then the following portions of DMF-SO$_3$-complex were added:

(a) 110 g.
(b) 220 g.   corresponding to   2.5
(c) 330 g.                      5
(d) 440 g.                      7.5   times the weight of alginic acid.
                                10

Cooling and mixing was continued for 10–15 minutes. The mixtures were placed in closed containers and kept in the refrigerator for about 3 hrs. The mixtures then were mixed with acetone, filtered off, again washed with acetone and filtered off, dissolved in water, and neutralized with ammonium hydroxide. The salts were precipitated in methanol and dried at 40° in the presence of an air stream:

|     | Yield (g.) | Visc. (1% cps.) | D.S. |
|-----|------------|-----------------|------|
| (a) | 59.5       | 421             | .083 |
| (b) | 80         | 148             | 1.48 |
| (c) | 72         | 109             | 1.24 |
| (d) | 73         | 73              | 1.28 |

10 g. of each of the first three samples was dialyzed for about 24 hrs. against distilled water, then precipitated from acetone and dried.

|     | Yield (g.) | D.S. |
|-----|------------|------|
| (a) | 3.7        | 0.76 |
| (b) | 3.0        | 1.61 |
| (c) | 4.2        | 1.36 |

Another experiment using alginic acid with an extra high viscosity and the complex prepared with a DMF-acetic acid mixture gave the following results.

|     | D.S. | Visc., cps. (1% soln.) | Amount of complex mixture |
| --- | --- | --- | --- |
| (a) | 0.13 | 1,050 | 3 ⎫ |
| (b) | 0.18 | 794 | 4 ⎬ times the weight of alginic acid. |
| (c) | 0.58 | 330 | 5 ⎥ |
| (d) | 0.97 | 222 | 6 ⎭ |

The D.S.'s are probably lower because the $SO_3$-content in this complex mixture is lower.

*Example II*

Alginic acid (300 g.) was washed with glacial acetic acid as described above, then mixed with 250 cc. of DMF and chilled. 210 g. of DMF-$SO_3$-complex was added and mixing and cooling was continued for 15 minutes. The mixture was divided into three portions; all three portions were refrigerated over different periods of time:

(a) 1.3 hr.
(b) 4 hr.
(c) 16 hr.

The ammonium salts were prepared and isolated as described under Example I. The viscosities of 1% aqueous solutions were:

(a) 168 cps.
(b) 164 cps.
(c) 165 cps.

After extraction with 90% aqueous methanol for 22 hr. in a Soxhlet:

Visc. (1%, cps.):                           D.S.
(a) 57                                       1.34
(b) 62                                       1.45
(c) 97                                       1.43

*Example III*

Alginic acid (300 g.) was washed with glacial acetic acid and reacted with 280 g. of DMF-$SO_3$-complex and 250 cc. of DMF for 2–3 hr. as described above. The reaction mixture was split into three portions, washed with a mixture of acetone and methanol, dissolved in water, and neutralized with:

(a) ammonium hydroxide
(b) sodium hydroxide
(c) potassium hydroxide

The portion neutralized with potassium hydroxide became extremely thick and gelatinized. The three different salts were precipitated and hardened in methanol and dried. The following data were obtained:

|     | Visc. (1%, cps.) | pH | D.S. |
| --- | --- | --- | --- |
| (a) | 165 | 5.97 | ⎫ |
| (b) | 95 | 6.98 | ⎬ 1.7 (dialyzed) |
| (c) | 77 | 6.75 | ⎭ |

The complex was prepared by the following procedure: 660 cc. of DMF was placed in a 3-necked 2-liter round bottom flask equipped with mechanical stirrer, dropping funnel, and $CaCl_2$-tube. The mixture was cooled in an ice bath and, while stirring, one pound of $SO_3$ was added dropwise. At the end of the addition the reaction product consisted of a crystalline material wet with DMF. This mixture was kept refrigerated and used as the DMF-$SO_3$-complex in the experiments above. If the complex was prepared by adding $SO_3$ to a mixture of DMF and acetic acid, the resulting product was a viscous solution. This product was used in the sulfation process as well and produced the same results.

For the analysis a portion of 0.5 g. of ammonium algin sulfate which had been extracted in a Soxhlet with aqueous methanol was dissolved in 50 cc. of 10% hydrochloric acid and the solution refluxed for 20–24 hr. The sulphuric acid formed was precipitated as barium sulfate by the addition of an excess of barium chloride. The precipitate was filtered off on a filter paper, the filter paper with the precipitate ashed at 800° C., and the residue weighed. From the weight of the barium sulfate the percentage of sulphur was calculated. The S-values for products with different degrees of substitution were calculated and plotted on a curve against the D.S. The D.S.'s of the experimental samples were taken from this curve.

The products obtainable in accordance with my invention are highly useful for a wide variety of applications, especially where an undegraded sulfate ester of algin is desired. The simple salts such as the sodium salts, lithium salts, ammonium salts, and the like, are especially valuable in connection with aqueous suspensions wherein they function as thickening agents, protective colloids, and the like.

As an example of utility, sufficient sodium algin sulfate was added to a commercial chocolate drink powder to give 0.1% on the finished drink. These ingredients were dry blended and added to cold milk with agitation. After a few minutes a viscosity of 33 cps. was obtained in contrast to about 5 cps. in a similar mixture without the sulfated algin product.

While my invention has been described with the aid of various examples, in which specific reactants, times and temperatures and the like have been indicated, it will be apparent that a considerable choice in variation of starting materials, reaction conditions, proportions and the like is permissible within the broad scope of my invention, as set forth in the claims which follow.

I claim:

1. A process of forming a sulfate ester of algin which comprises bringing together algin in a swollen, dehydrated activated form, sulphur trioxide, and sufficient of an N-dialkyl amide to form a complex with the said sulphur trioxide, so as to form a reaction mixture, and allowing said reaction mixture to stand until esterification has taken place to a degree of substitution within the range 0.1 to 1.9.

2. The process in accordance with claim 1 wherein said N-dialkyl amide is chosen from the class consisting of dimethyl formamide, dimethyl acetamide, dimethyl propionamide, diethyl formamide, and diethyl acetamide.

3. The process in accordance with claim 1 wherein said sulphur trioxide is present to an extent sufficient, and said reaction mixture is allowed to stand for a period of time sufficient, to result in a degree of substitution of at least 0.1.

4. The process of claim 2 in which said sulphur trioxide is present to an extent sufficient, and said reaction mixture is allowed to stand for a period of time sufficient, to result in a degree of substitution of at least 0.1.

5. The process of claim 1 in which said N-dialkyl amide is present in an amount greater than sufficient to form an equimolar complex with said sulphur trioxide.

6. The process of claim 2 in which said N-dialkyl amide is present in an amount greater than sufficient to form an equimolar complex with said sulphur trioxide.

7. The product obtained in accordance with the process of claim 1.

8. The product obtained in accordance with the process of claim 2.

9. The process of claim 2 wherein said esterification reaction is carried out at a temperature within the range of 0 to 10° C.

10. The process of claim 1 wherein said activated algin is prepared by dehydrating wet swollen algin by treatment with glacial acetic acid.

11. The process of claim 1 wherein said activated algin is prepared by dehydrating wet swollen algin by treatment with anhydrous propionic acid.

12. The process of claim 10 wherein said esterification reaction is carried out at a temperature within the range of 0 to 10° C.

13. The process of claim 12 wherein said N-dialkyl amide is dimethyl formamide, said dimethyl formamide being present in an amount which is at least sufficient to form an equimolar complex with said sulfur trioxide.

14. The product obtained in accordance with the process of claim 13.

15. The sodium salt of the product defined in claim 8.
16. The potassium salt of the product defined in claim 8.
17. The lithium salt of the product defined in claim 8.
18. The ammonium salt of the product defined in claim 8.

References Cited

UNITED STATES PATENTS

| | | | |
|---|---|---|---|
| 2,705,710 | 4/1955 | Blume | 260—229 |
| 3,057,855 | 10/1962 | Smith et al. | 260—233.5 |
| 3,077,373 | 2/1963 | Kerr | 260—233.5 |
| 3,168,547 | 2/1965 | Turbak | 260—209.6 |
| 3,200,110 | 8/1965 | Gollin et al. | 260—210 |

DONALD E. CZAJA, *Primary Examiner.*

LEON J. BERCOVITZ, *Examiner.*

R. W. MULCAHY, *Assistant Examiner.*